(12) United States Patent
Kim et al.

(10) Patent No.: US 10,923,699 B2
(45) Date of Patent: Feb. 16, 2021

(54) LITHIUM-SULFUR BATTERY INCLUDING POLYMER NON-WOVEN FABRIC BETWEEN POSITIVE ELECTRODE AND SEPARATOR

(71) Applicant: LG CHEM, LTD., Seoul (KR)

(72) Inventors: Taek Gyoung Kim, Daejeon (KR); Doo Kyung Yang, Daejeon (KR); Intae Park, Daejeon (KR)

(73) Assignee: LG CHEM, LTD., Seoul (KR)

(*) Notice: Subject to any disclaimer, the term of this patent is extended or adjusted under 35 U.S.C. 154(b) by 169 days.

(21) Appl. No.: 16/304,950

(22) PCT Filed: Jul. 6, 2017

(86) PCT No.: PCT/KR2017/007242
§ 371 (c)(1),
(2) Date: Nov. 27, 2018

(87) PCT Pub. No.: WO2018/048081
PCT Pub. Date: Mar. 15, 2018

(65) Prior Publication Data
US 2020/0235364 A1    Jul. 23, 2020

(30) Foreign Application Priority Data
Sep. 9, 2016   (KR) .................. 10-2016-0116155

(51) Int. Cl.
*H01M 2/16* (2006.01)
*H01M 10/052* (2010.01)
*H01M 10/42* (2006.01)

(52) U.S. Cl.
CPC ......... *H01M 2/1686* (2013.01); *H01M 2/162* (2013.01); *H01M 10/052* (2013.01); *H01M 10/4235* (2013.01)

(58) Field of Classification Search
CPC .. H01M 2/1686; H01M 2/162; H01M 10/052; H01M 10/4235
(Continued)

(56) References Cited

U.S. PATENT DOCUMENTS

2005/0175903 A1   8/2005  Kim et al.
2012/0315545 A1   12/2012 Son et al.
(Continued)

FOREIGN PATENT DOCUMENTS

JP    2000-208122 A    7/2000
JP    2015-530488 A    7/2013
(Continued)

OTHER PUBLICATIONS

International Search Report issued in PCT/KR2017/007242 (PCT/ISA/210), dated Oct. 26, 2017.
European Search Report for Appl. No. 17848965.4 dated Apr. 30, 2019.

*Primary Examiner* — Sean P Cullen
(74) *Attorney, Agent, or Firm* — Birch, Stewart, Kolasch & Birch, LLP

(57) ABSTRACT

A lithium-sulfur battery is provided. More specifically, a lithium-sulfur battery including a polymer non-woven fabric containing a liquid electrolyte between a positive electrode including sulfur and a separator is provided. By including a polymer non-woven fabric containing a liquid electrolyte between a positive electrode and a separator, the lithium-sulfur battery according to the present invention is capable of continuously supplying the liquid electrolyte to the positive electrode, and suppressing polysulfide elution. Accordingly, the lithium-sulfur battery has a reduced discharge overvoltage, and exhibits excellent discharge capacity and life time properties.

9 Claims, 1 Drawing Sheet

(58) Field of Classification Search
USPC .................................................. 429/144, 145
See application file for complete search history.

(56) References Cited

U.S. PATENT DOCUMENTS

| | | | |
|---|---|---|---|
| 2013/0108899 A1 | 5/2013 | Schaefer | |
| 2013/0196562 A1* | 8/2013 | Hou | D04H 1/00 442/327 |
| 2015/0132632 A1 | 5/2015 | Hwang et al. | |
| 2015/0171398 A1* | 6/2015 | Roumi | G01R 31/3828 429/7 |
| 2015/0188109 A1 | 7/2015 | Kim et al. | |
| 2015/0325831 A1* | 11/2015 | Dennes | H01G 11/56 429/144 |
| 2016/0190538 A1 | 6/2016 | Lee et al. | |
| 2016/0365558 A1* | 12/2016 | Kia | H01M 2/1666 |
| 2017/0005312 A1 | 1/2017 | Fukuda et al. | |
| 2017/0263978 A1 | 9/2017 | Koh et al. | |
| 2017/0331150 A1 | 11/2017 | Park et al. | |

FOREIGN PATENT DOCUMENTS

| | | | | |
|---|---|---|---|---|
| JP | WO 2015/092959 A1 | 6/2015 | | |
| JP | 2015-128063 A | 7/2015 | | |
| KR | 10-2005-0022616 A | 3/2005 | | |
| KR | 10-0502357 B1 | 7/2005 | | |
| KR | 10-2012-0135808 A | 12/2012 | | |
| KR | 10-2014-0064405 A | 5/2014 | | |
| KR | 10-2014-0073739 A | 5/2014 | | |
| KR | 10-2014-0082261 A | 7/2014 | | |
| KR | 10-2015-0050518 A | 5/2015 | | |
| KR | 10-2015-0078434 A | 7/2015 | | |
| KR | 10-2015-0109240 A | 10/2015 | | |
| KR | 10-2016-0051055 A | 5/2016 | | |
| KR | 10-2016-0051574 A | 5/2016 | | |
| KR | 10-2016-0051652 A | 5/2016 | | |
| WO | WO-2015026182 A1 * | 2/2015 | .......... | H01M 2/1686 |
| WO | WO-2015114074 A1 * | 8/2015 | ............ | H01M 4/382 |

* cited by examiner

[FIG 1]
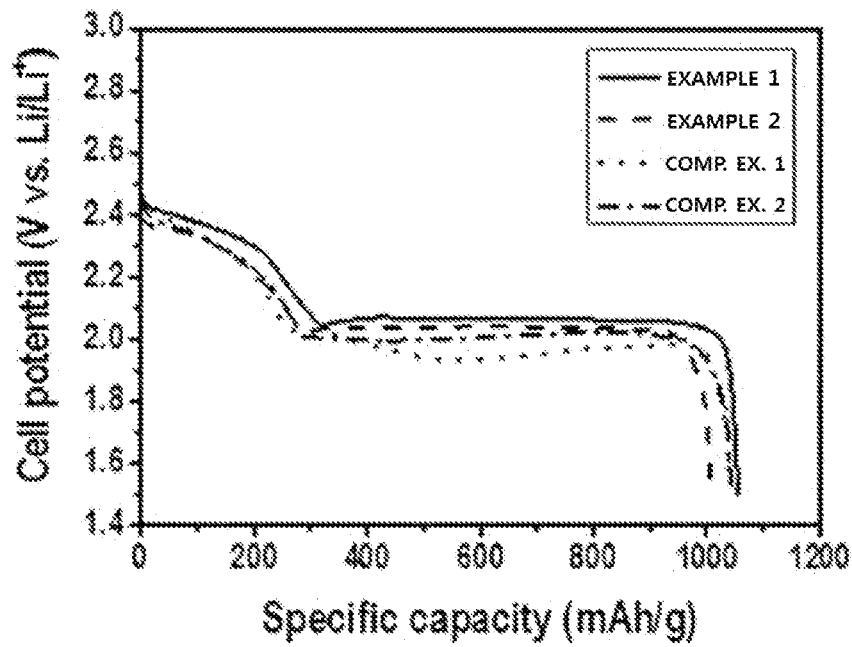
[FIG 2]
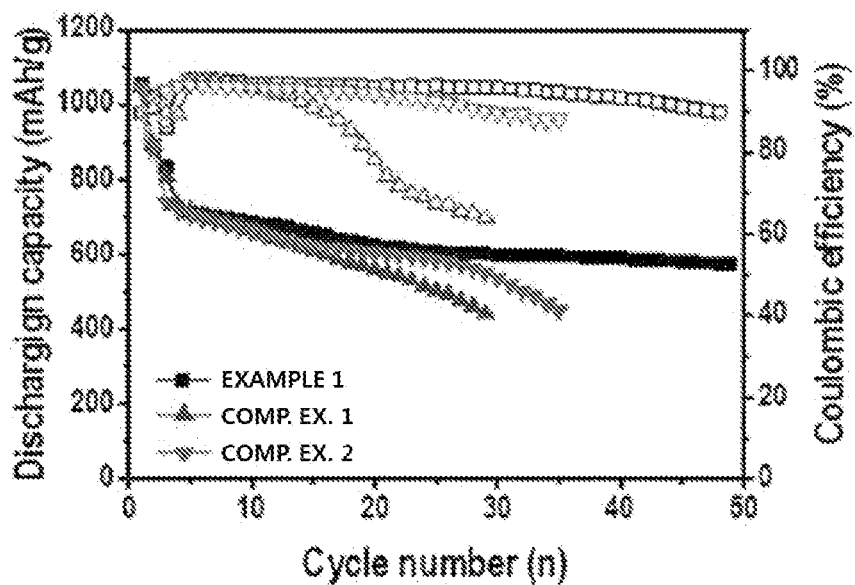

LITHIUM-SULFUR BATTERY INCLUDING POLYMER NON-WOVEN FABRIC BETWEEN POSITIVE ELECTRODE AND SEPARATOR

TECHNICAL FIELD

This application claims priority to and the benefits of Korean Patent Application No. 10-2016-0116155, filed with the Korean Intellectual Property Office on Sep. 9, 2016, the entire contents of which are incorporated herein by reference.

The present invention relates to a lithium-sulfur battery. More specifically, the present invention relates to a lithium-sulfur battery further including a polymer non-woven fabric containing a liquid electrolyte between a positive electrode including sulfur and a separator.

BACKGROUND ART

With recent development of portable electronic devices, electric vehicles and large capacity power storage systems, demands for large capacity batteries have arisen.

A lithium-sulfur battery is a secondary battery using a sulfur series material having sulfur-sulfur bonds (S—S bonds) as a positive electrode active material and using lithium metal as a negative electrode active material, and sulfur, a main material of the positive electrode active material, has advantages of being very abundant in resources, having no toxicity and having a low atomic weight.

In addition, a lithium-sulfur battery has theoretical discharge capacity of 1672 mAh/g-sulfur and theoretical energy density of 2,600 Wh/kg, which is very high compared to theoretical energy density of other battery systems currently studied (Ni-MH battery: 450 Wh/kg, Li—FeS battery: 480 Wh/kg, Li—MnO$_2$ battery: 1,000 Wh/kg, Na—S battery: 800 Wh/kg), and therefore, has received attention as a battery having a high energy density property.

During a discharge reaction of a lithium-sulfur battery, an oxidation reaction of lithium occurs in a negative electrode (anode), and a reduction reaction of sulfur occurs in a positive electrode (cathode). Sulfur has a cyclic S$_8$ structure before discharge, and electric energy is stored and produced using an oxidation-reduction reaction in which an oxidation number of S decreases as S—S bonds are broken during a reduction reaction (discharge), and an oxidation number of S increases as S—S bonds are formed again during an oxidation reaction (charge).

During such a reaction, the sulfur is converted to linear-structured lithium polysulfide (Li$_2$S$_x$, x=8, 6, 4 and 2) from cyclic S$_8$ by the reduction reaction, and as a result, lithium sulfide (Li$_2$S) is lastly produced when such lithium polysulfide is completely reduced. By the process of being reduced to each lithium polysulfide, a discharge behavior of a lithium-sulfur (Li—S) battery shows gradual discharging voltages unlike lithium ion batteries.

Among lithium polysulfide such as Li$_2$S$_8$, Li$_2$S$_6$, Li$_2$S$_4$ and Li$_2$S$_2$, lithium polysulfide having a high sulfur oxidation number (Li$_2$S$_x$, commonly x>4) is particularly readily dissolved in a hydrophilic liquid electrolyte. Lithium polysulfide dissolved in the liquid electrolyte is diffused away from a lithium polysulfide-produced positive electrode due to a concentration difference. Lithium polysulfide eluted from the positive electrode as above is washed away out of the positive electrode reaction area making it impossible to be gradually reduced to lithium sulfide (Li$_2$S). In other words, lithium polysulfide present in a dissolved state outside the positive electrode and the negative electrode is not able to participate in charge and discharge reactions of a battery, and therefore, the amount of a sulfur material participating in an electrochemical reaction in the positive electrode decreases, and as a result, it becomes a main factor causing charge capacity reduction and energy reduction of a lithium-sulfur battery. In addition, lithium polysulfide dissolution increases viscosity of the liquid electrolyte, and this becomes a factor causing a discharge overvoltage of a battery. In addition thereto, lithium polysulfide diffusing to the negative electrode directly reacts with lithium metal to corrode the lithium metal negative electrode.

As described above, lithium polysulfide elution adversely affects a capacity retention rate and a life time property of a battery, and various attempts have been made in order to suppress lithium polysulfide elution. As one example, a method of adding an additive having a sulfur-adsorbing property to a positive electrode mixture, a method of surface treating a sulfur surface with a material including hydroxide, oxyhydroxide of a coating element, oxycarbonate of a coating element or hydroxycarbonate of a coating element, and a method of preparing a carbon material to a nanostructure body and locking lithium polysulfide therein may be included.

However, the method of adding an additive has a problem of conductive degeneration and a risk of side reactions, the surface treatment technology has a disadvantage of causing an active material loss during a treatment process and being unfavorable in terms of costs, and the carbon nanostructure body has a disadvantage of having a complex preparation process.

In addition, such existing technologies have had problems of not greatly improving a capacity property and a life time property of a lithium-sulfur battery.

PRIOR ART DOCUMENTS (Patent Document 1) Korean Patent Application Laid-Open Publication No. 2015-0109240, Positive electrode for lithium sulfur battery and lithium sulfur battery including the same

DISCLOSURE

Technical Problem

In view of the above, the inventors of the present invention have manufactured a lithium-sulfur battery having a new structure capable of preventing polysulfide elution, and have identified that the lithium-sulfur battery manufactured as above has exhibited excellent capacity property and life time property to complete the present invention.

Accordingly, an aspect of the present invention provides a lithium-sulfur battery.

Technical Solution

According to an aspect of the present invention, there is provided a lithium-sulfur battery including a positive electrode; a negative electrode; a separator; and a liquid electrolyte, and further comprising a polymer non-woven fabric provided between the positive electrode and the separator.

According to another aspect of the present invention, there is provided a lithium-sulfur battery including a positive electrode; a negative electrode; a separator; and a liquid electrolyte, wherein the positive electrode includes a positive electrode active material layer formed on a current collector, a surface of the positive electrode active material layer is coated with a polymer film including a non-aqueous liquid electrolyte, and voids in the positive electrode active material layer are filled with a polymer material including the non-aqueous liquid electrolyte, and the lithium-sulfur battery further includes a polymer non-woven fabric between the positive electrode and the separator.

Advantageous Effects

A lithium-sulfur battery according to the present invention can contain a liquid electrolyte between a positive electrode and a separator, and, by further including a polymer non-woven fabric having excellent durability for the liquid electrolyte, can continuously supply the liquid electrolyte to the positive electrode and can suppress polysulfide elution. Accordingly, the lithium-sulfur battery according to the present invention has a decreased discharge overvoltage, and exhibits excellent capacity and life time properties.

DESCRIPTION OF DRAWINGS

FIG. 1 is an initial discharge profile of batteries of Examples 1 and 2 and Comparative Examples 1 and 2.

FIG. 2 is a charge and discharge profile during 50 cycles of batteries of Example 1 and Comparative Examples 1 and 2.

BEST MODE

The present invention provides a lithium-sulfur battery including a positive electrode; a negative electrode; a separator; and a liquid electrolyte, and further comprising a polymer non-woven fabric provided between the positive electrode and the separator.

In the present invention, the polymer non-woven fabric contains a liquid electrolyte and performs a role of continuously supplying the liquid electrolyte to the positive electrode. In addition, the polymer non-woven fabric functions as a buffer layer, and performs a role of locking in polysulfide produced during charge and discharge of a battery. Accordingly, the lithium-sulfur battery of the present invention rarely has an overvoltage phenomenon, and has excellent capacity property and life time property of a battery due to a reduced positive electrode active material loss.

Hereinafter, the present invention will be described in detail so that those skilled in the art may readily implement the present invention. However, the present invention may be implemented in various different forms, and is not limited to the embodiments described herein.

In the present specification, "polysulfide" is a concept including all of "polysulfide ions ($S_x^{2-}$, x=8, 6, 4, 2))" and "lithium polysulfide ($Li_2S_x$ or $LiS_x^-$, x=8, 6, 4, 2)".

Polymer Non-Woven Fabric

In the present invention, the polymer non-woven fabric is provided between the positive electrode and the separator, and performs a role of a buffer layer capable of locking in polysulfide. In other words, a non-woven fabric having higher porosity than general separators may contain a liquid electrolyte in large quantities, and therefore, a polysulfide concentration in the positive electrode side is diluted suppressing a polysulfide diffusion phenomenon. Accordingly, a positive electrode active material loss is reduced, and an overvoltage phenomenon occurring from an increase in the liquid electrolyte viscosity due to polysulfide dissolution may be prevented.

In addition, the polymer non-woven fabric prevents an overvoltage by continuously supplying the liquid electrolyte to the positive electrode active material, and enhances battery performance.

In contrast, when the polymer non-woven fabric is provided between the negative electrode and the separator, the effect of suppressing polysulfide elution described above may not be expected, and lithium dendrite growth may be facilitated instead since current density increases on the electrode surface.

The polymer non-woven fabric used in the present invention is preferably a material having excellent lithium ion conductivity, impregnating the liquid electrolyte in large quantities and having small electric resistance in a state impregnating the liquid electrolyte.

In addition, in order to secure durability, the polymer non-woven fabric is preferably a material having excellent corrosion resistance for the liquid electrolyte, having little swelling phenomenon caused by the liquid electrolyte, and having excellent dimensional stability.

The material of the polymer non-woven fabric is not limited as long as it satisfies the above-mentioned properties, but is preferably one or more types selected from the group consisting of polyimide, polyethylene, polypropylene, polyethylene oxide, polyethylene terephthalate, polyvinyl alcohol, polyacrylonitrile and polyurethane, and more preferably, polyimide is used.

Polyimide is a high heat resisting polymer synthesized with aromatic diamine and aromatic tetracarboxylic acid dianhydride, may contain a liquid electrolyte in large quantities due to its excellent wettability, and has excellent corrosion resistance and dimensional stability for the liquid electrolyte, and therefore, is suitable to perform a role of a buffer layer.

The polymer non-woven fabric has a three-dimensional network structure with polymer fibers having a diameter of 100 nm to 400 nm entangled with each other, and as the polymer non-woven fabric, those commercially available or directly prepared may be used.

Methods of preparing the polymer non-woven fabric is not particularly limited, and for example, the polymer non-woven fabric may be prepared through electro-spinning, melt spinning, electro-blowing, melt-blowing (complex radiation, split fiber), spun-bonded, air laid or wet laid using a polymer solution.

Herein, the polymer preferably has a weight average molecular weight of 100,000 g/mol to 6,000,000 g/mol in terms of processibility. In other words, when the polymer molecular weight satisfies the above-mentioned range, the polymer solution viscosity becomes a proper level to use an electro-spinning method and the like.

In the present invention, the polymer non-woven fabric preferably has a thickness of 10 μm to 25 μm.

The polymer non-woven fabric having a thickness of less than 10 μm is not preferred since effects as a buffer layer may not be secured, and the thickness being greater than 25 μm causes a problem of decreasing battery energy density due to the volume and the mass occupied by the buffer layer in the battery, and therefore, the thickness is properly controlled in the above-mentioned range.

The polymer non-woven fabric preferably has porosity of 60% to 80% and more preferably has porosity of 65% to 75%.

Herein, the porosity means a ratio of a volume occupied by pores with respect to a total volume of a porous material. The porosity may be calculated by the following Mathematical Formula 1.

Porosity (%)={1−(density of polymer non-woven fabric/density of raw material polymer)}*100   [Mathematical Formula 1]

As the polymer non-woven fabric has higher porosity, the amount of liquid electrolyte impregnation may increase, however, when porosity is excessively high when used with a small thickness of 10 μm to 25 μm as above, mechanical strength decreases, and the polymer non-woven fabric may break. Accordingly, the porosity preferably satisfies the above-mentioned range in order to secure processibility and durability.

The polymer non-woven fabric may have an average pore diameter of 0.2 μm to 1 μm and preferably 0.2 μm to 0.5 μm. When satisfying the above-mentioned range, thickness uniformity of the polymer non-woven fabric is enhanced, and uniform ion transfer may be achieved.

In addition, the polymer non-woven fabric may have tensile strength of 10 MPa to 200 MPa, however, when the polymer non-woven fabric has porosity of 60% to 80%, the tensile strength is more preferably from 15 MPa to 30 MPa. When satisfying such mechanical strength, durability and dimensional stability may be secured during battery operation, and excellent processibility is obtained.

In the present invention, the polymer non-woven fabric preferably has the amount of liquid electrolyte impregnation of 150% to 350%, which is defined as the increased weight of the liquid electrolyte relative to the weight of the polymer non-woven fabric.

When the amount of liquid electrolyte impregnation of the polymer non-woven fabric satisfies the above-mentioned range, the liquid electrolyte may be smoothly supplied to the positive electrode active material, which enhances battery performance and reduces an overvoltage.

Positive Electrode

The positive electrode of the lithium-sulfur battery according to the present invention includes a positive electrode active material formed on a positive electrode current collector.

As the positive electrode current collector, those capable of being used as a current collector in the art may all be used, and specifically, foamed aluminum, foamed nickel or the like having excellent conductivity may be preferably used.

The positive electrode active material may include elemental sulfur ($S_8$), sulfur series compounds or mixtures thereof. The sulfur series compound may specifically be $Li_2S_n$ (n≥1), an organosulfur compound, a carbon-sulfur polymer (($C_2S_x)_n$: x=2.5 to 50, n≥2) or the like. These may be used as a composite with a conductor since a sulfur material alone does not have electrical conductivity.

The conductor may be porous. Accordingly, as the conductor, those having porosity and conductivity may be used without limit, and for example, carbon-based materials having porosity may be used. As such carbon-based materials, carbon black, graphite, graphene, active carbon, carbon fiber and the like may be used. In addition, metallic fibers such as metal mesh; metallic powders such as copper, silver, nickel and aluminum; or organic conductive materials such as polyphenylene derivatives may also be used. The conductive materials may be used either alone or as a mixture.

The positive electrode may further include a binder for binding of the positive electrode active material and the conductor and for binding on the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

Such a positive electrode may be prepared using common methods, and specifically, may be prepared by coating a composition for forming a positive electrode active material layer prepared by mixing a positive electrode active material, a conductor and a binder in an organic solvent or water on a current collector and drying the result, and selectively, compression molding the result on the current collector for enhancing electrode density. Herein, as the organic solvent, those capable of uniformly dispersing the positive electrode active material, the binder and the conductor, and readily evaporating are preferably used. Specifically, N-methyl-2-pyrrolidone, acetonitrile, methanol, ethanol, tetrahydrofuran, water, isopropyl alcohol and the like may be included.

Meanwhile, in order to enhance a liquid electrolyte moisture retention ability of the positive electrode and prevent lithium polysulfide outflow, the positive electrode active material layer of the lithium-sulfur battery according to the present invention may have its surface coated with a polymer film including a non-aqueous liquid electrolyte. In addition, voids inside the positive electrode active material layer may be filled with a polymer material including the non-aqueous liquid electrolyte. Herein, the non-aqueous liquid electrolyte used may be the same as the non-aqueous liquid electrolyte used in the lithium-sulfur battery, and descriptions thereon will be provided below.

The polymer film and the polymer material are preferably formed by polymerizing a composition including at least one or more monomers selected from the group consisting of acrylamide, divinyl benzene, butyl acrylate, hexyl acrylate, trimethylolpropane triacrylate, butanediol diacrylate, butanediol dimethacrylate, diallyl succinate, diallyl malate, diallyl suberate, ethylene glycol diacrylate, ethylene glycol dimethacrylate, ethylene glycol divinyl ether, tritetraethylene dimethyl acrylate (TTEGDA), poly(ethylene glycol) diacrylate (PEGDA), polyethylene glycol dimethacrylate (PEGDMA), poly(ethylene glycol) divinyl ether and diglycidyl ester, and the non-aqueous liquid electrolyte, but are not limited thereto.

The composition for forming the polymer film and the polymer material preferably include the monomer in 10% by weight to 50% by weight and the non-aqueous electrolyte in 50% by weight to 90% by weight. A more preferred content of the monomer is from 10% by weight to 30% by weight. When the monomer content is less than 10% by weight, the degree of crosslinking is too low when crosslinked causing problems in that crosslinking properties are not sufficiently obtained, and liquid electrolyte moisture retention ability and mechanical properties are poor. When the content is greater than 50% by weight, internal resistance of the positive electrode plate increases, which functions as a cause of capacity decrease during a high rate charge and discharge. The monomer preferably has a weight average molecular weight of 200 g/mol to 2,000 g/mol and more preferably 400 g/mol to 1,000 g/mol. When the monomer has a molecular weight of less than 200 g/mol, crosslinking point density in the polymer molecular structure is too high after crosslinking causing concern such that the lithium salt or the positive electrode active material may not freely move, and when the molecular weight is greater than 2,000 g/mol, crosslinking point density in the polymer molecular structure is too low after crosslinking causing concern such that a liquid electrolyte moisture retention ability may decline.

The polymer film preferably has a coating thickness of 0.5 µm to 10 µm. When the coating thickness is less than 0.5 µm, the coating thickness is too small making it difficult to exhibit a liquid electrolyte moisture retention ability, and when the coating thickness is greater than 10 µm, the coating thickness is too large causing a problem of increasing interfacial resistance.

The method for preparing the positive electrode including a polymer film is not particularly limited, however, a method as below may be used as one example.

A positive electrode is prepared by forming a positive electrode active material layer on a current collector, and a composition for forming the polymer film and the polymer material is coated on the positive electrode active material layer. Herein, the composition is allowed to penetrate into voids of the positive electrode active material layer as well. As the coating method, dip coating, roller coating, spin coating, vacuum impregnation or the like may be used, however, the coating method is not limited thereto.

Next, the composition-coated positive electrode is treated with heat press, ultraviolet rays, an electron beam, X-rays or γ-rays to polymerize the monomer. When using heat press for the monomer polymerization, the temperature is preferably adjusted to 50° C. to 90° C., and the heat press time is preferably adjusted to 20 seconds to 80 seconds. In this step, the surface of the positive electrode active material layer is coated with a polymer film including a non-aqueous electrolyte, and voids in the positive electrode active material layer are filled with a polymer material including the non-aqueous electrolyte.

When using a sulfur positive electrode coated with a polymer film as described above, a liquid electrolyte moisture retention ability of the positive electrode is enhanced and lithium polysulfide outflow is reduced, and as a result, a utilization rate of the positive electrode active material may increase, and side reactions of a lithium metal negative electrode caused by lithium polysulfide may be suppressed.

Negative Electrode

The negative electrode of the lithium-sulfur battery according to the present invention includes a negative electrode active material formed on a negative electrode current collector.

The negative electrode current collector may specifically be selected from the group consisting of copper, stainless steel, titanium, silver, palladium, nickel, alloys thereof and combinations thereof. The stainless steel may be surface treated with carbon, nickel, titanium or silver, and aluminum-cadmium alloys may be used as the alloy. In addition thereto, baked carbon, non-conductive polymers of which surface is treated with a conductor, conductive polymers or the like may also be used.

As the negative electrode active material, a material capable of reversibly intercalating or deintercalating lithium ions ($Li^+$), a material capable of reversibly forming a lithium-containing compound by reacting with lithium ions, lithium metal or a lithium alloy may be used. Examples of the material capable of reversibly intercalating or deintercalating lithium ions ($Li^+$) may include crystalline carbon, amorphous carbon or a mixture thereof. Examples of the material capable of reversibly forming a lithium-containing compound by reacting with lithium ions ($Li^+$) may include tin oxide, titanium nitrate or silicon. Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al) and tin (Sn).

The negative electrode may further include a binder for binding of the negative electrode active material and the conductor and for binding on the current collector, and specifically, the binder is the same as the binder of the positive electrode described above.

In addition, the negative electrode may be lithium metal or a lithium alloy. As nonlimiting examples, the negative electrode may be a thin film of lithium metal, or may be an alloy of lithium and one or more types of metals selected from the group consisting of Na, K, Rb, Cs, Fr, Be, Mg, Ca, Sr, Ba, Ra, Al and Sn.

Liquid Electrolyte

The liquid electrolyte of the lithium-sulfur battery according to the present invention is a lithium salt-containing non-aqueous liquid electrolyte, and is formed with a lithium salt and a solvent.

The lithium salt is a material readily dissolved in a non-aqueous organic solvent, and, for example, may be one or more selected from the group consisting of LiCl, LiBr, LiI, $LiClO_4$, $LiBF_4$, $LiB_{10}Cl_{10}$, $LiB(Ph)_4$, $LiC_4BO_3$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, LiC $(CF_3SO_2)_3$, LiN $(CF_3SO_2)_2$, $LiN(C_2F_5SO_2)_2$, $LiN(SO_2F)_2$, chloroborane lithium, lower aliphatic carboxylic acid lithium, lithium tetraphenylborate and lithium imide.

The concentration of the lithium salt may be from 0.1 M to 4.0 M and preferably from 0.5 M to 2.0 M depending on various factors such as an accurate composition of the liquid electrolyte mixture, solubility of the salt, conductivity of the dissolved salt, charge and discharge conditions of a battery, a working temperature, and other factors known in the lithium-sulfur battery field. When the lithium salt concentration is less than the above-mentioned range, conductivity of the electrolyte may decrease causing decline in the battery performance, and when the lithium salt concentration is greater than the above-mentioned range, viscosity of the electrolyte increases leading to a decrease in the lithium ion ($Li^{30}$ ) mobility, and therefore, a proper concentration is preferably selected in the above-mentioned range.

The non-aqueous organic solvent is a material capable of favorably dissolving the lithium salt, and preferably, aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, 1-ethoxy-2-methoxyethane, diethylene glycol dimethyl ether, triethylene glycol dimethyl ether, tetraethylene glycol dimethyl ether, tetrahydroxy franc, 2-methyl tetrahydrofuran, dimethyl sulfoxide, 1,3-dioxolane, 4-methyl-1,3-dioxene, diethyl ether, formamide, dimethylformamide, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used, and the organic solvent may be used either alone or in a mixed solution form of two or more of these.

The non-aqueous liquid electrolyte for a lithium-sulfur battery of the present invention may further include a nitrate- or nitrite-based compound as an additive. The nitrate- or nitrite-based compound is effective in forming a stable film in a lithium electrode and enhancing charge and discharge efficiency. Such a nitrate- or nitrite-based compound is not particularly limited in the present invention, however, one type selected from the group consisting of inorganic nitrate or nitric compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$) or ammonium nitrite ($NH_4NO_2$); organic nitrate or nitric compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite or octyl nitrite; organic nitro compounds such as nitromethane, nitropropane, nitrobutane, nitrobenzene, dinitrobenzene, nitropyridine, dinitropyridine, nitrotoluene or dinitrotoluene and combinations thereof may be used, and preferably, lithium nitrate is used.

In addition, the non-aqueous liquid electrolyte may further include other additives for the purpose of improving charge and discharge properties, flame retardancy and the like. Examples of the additives may include pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

Separator

The separator of the lithium-sulfur battery of the present invention is a physical separator having a function of physically separating electrodes, and those commonly used as a separator may be used without particular limit, and particularly, those having an excellent electrolyte moisture retention ability while having low resistance for ion migration of the liquid electrolyte are preferred.

In addition, the separator enables lithium ion transfer between the positive electrode and the negative electrode while separating or insulating the positive electrode and the negative electrode from each other. Such a separator may be formed with porous of 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both the buffer layer and the separator, the amount of liquid electrolyte impregnation and an ion conductive property decrease, and effects of reducing an overvoltage and improving a capacity property become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

According to one preferred embodiment of the present invention, an ethylene homopolymer (polyethylene) polymer film is used as the separator, and a polyimide non-woven fabric is used as the buffer layer. Herein, the polyethylene polymer film preferably has a thickness of 10 μm to 25 μm and porosity of 40% to 50%.

Appearances of the lithium-sulfur battery according to the present invention are not particularly limited, and may include a cylinder-type, a square-type, a pouch-type, a coin-type using a can, and the like.

Hereinafter, preferred examples are provided in order to illuminate the present invention, however, the following examples are for illustrative purposes only, and it is obvious to those skilled in the art that various changes and modifications may be made within the scope and technological ideas of the present invention, and such changes and modifications also belong to the attached claims.

EXAMPLE

Preparation Example 1: Manufacture of Lithium-Sulfur Battery

Using the following manufacturing method, lithium-sulfur batteries that either include or do not include a polymer non-woven fabric between a positive electrode and a separator were manufactured.

(1) Example 1: Manufacture of Lithium-Sulfur Battery Including Polyimide (PI) Non-Woven Fabric A composition for forming a positive electrode active material layer was prepared by mixing sulfur, Super-P (SP), a conductor and a binder using a ball mill with water as a solvent. Herein, denka black was used as the conductor, a binder having a mixed form of SBR and CMC was used as the binder, and the sulfur and SP (9:1 ratio):conductor:binder were employed to have a mixing ratio of 90:10:10 in a weight ratio. The prepared composition for forming a positive electrode active material layer was coated on an aluminum current collector, and then dried to prepare a positive electrode (energy density of positive electrode: 2.5 mAh/$cm^2$).

The prepared positive electrode and a negative electrode were located to face each other, and then a polyethylene separator having a thickness of 20 μm and porosity of 45% was provided between the positive electrode and the negative electrode, and a PI non-woven fabric having a thickness of 20 μm and porosity of 70% was inserted between the separator and the positive electrode.

After that, an electrolyte was injected into the case to manufacture a lithium-sulfur battery. Herein, the electrolyte was prepared by dissolving 1 M concentration of lithium bis(fluorosulfonyl)imide (LiFSI) and 1 wt % of $LiNO_3$ in an organic solvent formed with dioxolane (DOL) and dimethylene glycol dimethyl ether (DEGDME) (mixed volume ratio=6:4).

(2) Example 2: Manufacture of Lithium-Sulfur Battery Including Polyacrylonitrile (PAN) Non-woven Fabric A lithium-sulfur battery was manufactured in the same manner as in Example 1 except that a PAN non-woven fabric having a thickness of 20 μm and porosity of 72% was provided between the separator and the positive electrode.

(3) Comparative Example 1: Manufacture of Lithium-Sulfur Battery

A lithium-sulfur battery was manufactured in the same manner as in Example 1 except that the PI non-woven fabric was not included.

(4) Comparative Example 2: Manufacture of Lithium-Sulfur Battery Doubly Including Polyethylene (PE) Separator A lithium-sulfur battery was manufactured in the same manner as in Example 1 except that, instead of the PI non-woven fabric, a PE separator having porosity of 45% was provided therebetween.

The porosity and the amount of liquid electrolyte impregnation of the PI non-woven fabric, the PAN non-woven fabric and the PE separator used in Examples 1 and 2 and Comparative Examples 1 and 2 are listed in the following Table 1.

TABLE 1

|  | PI Non-woven Fabric | PAN Non-woven Fabric | PE Separator |
|---|---|---|---|
| Porosity (%) | 73 | 72 | 45 |
| Amount of Liquid Electrolyte Impregnation (%) | 303 | 200 | 125 |

Experimental Example 1: Battery Performance Evaluation

For each of the batteries manufactured in Preparation Example 1, battery performance evaluation was performed. Herein, the operation condition was set such that each of the batteries was charged and discharged 2.5 times with 0.1 C, and then with 0.3 C charge/0.5 C discharge.

FIG. 1 shows an initial discharge profile. When referring to FIG. 1, it was identified that Examples 1 and 2 had more superior initial discharge capacity and lower discharge overvoltage compared to Comparative Example 1 without a buffer layer. Particularly, favorable results were obtained in Example 1 using a PI non-woven fabric compared to Example 2 using a PAN non-woven fabric. Meanwhile, when referring to the data of Comparative Example 2, initial discharge capacity somewhat increased when providing one more PE separator, however, the effect was insignificant compared to the polymer non-woven fabric of the present invention.

When examining a charge and discharge profile during 50 cycles shown in FIG. 2, it was seen that Comparative Example without a buffer layer had rapidly decreased Coulomb efficiency and discharge capacity after 20 cycles, and it was identified that Comparative Example 2 provided with one more PE separator also had declined battery performance after 30 cycles.

Meanwhile, it was identified that Example 1 including a PI non-woven fabric exhibited stable and excellent cycle properties up to 50 cycles. This is considered to be due to the fact that polysulfide elution was effectively suppressed by the PI non-woven fabric, and an active material loss was reduced and a sulfur utilization rate increased therefrom.

Based on the above-mentioned results, it was identified that a PI non-woven fabric having high corrosion resistance for a liquid electrolyte was suited as a polymer non-woven fabric provided between a positive electrode and a separator, and by including such a polymer non-woven fabric as a buffer layer, capacity and life time properties of a lithium-sulfur battery may be enhanced.

The invention claimed is:

1. A lithium-sulfur battery, comprising:
   a positive electrode;
   a negative electrode;
   a separator;
   a liquid electrolyte, and
   a polymer non-woven fabric provided between the positive electrode and the separator,
   wherein a material of the polymer non-woven fabric is one or more selected from the group consisting of polyimide, polyethylene oxide, polyethylene terephthalate, polyvinyl alcohol, polyacrylonitrile and polyurethane,
   wherein the polymer non-woven fabric has an average pore diameter of 0.2 μm to less than 0.5 μm, and
   wherein the polymer non-woven fabric has tensile strength of 15 MPa to less than 30 MPa.

2. The lithium-sulfur battery of claim 1, wherein the polymer non-woven fabric has a thickness of 10 μm to 25 μm.

3. The lithium-sulfur battery of claim 1, wherein the polymer non-woven fabric is formed with a polymer having a weight average molecular weight of 100,000 g/mol to 6,000,000 g/mol.

4. The lithium-sulfur battery of claim 1, wherein the polymer non-woven fabric is formed with a polymer fiber having a diameter of 100 nm to 400 nm.

5. The lithium-sulfur battery of claim 1, wherein the polymer non-woven fabric has porosity represented by the following Mathematical Formula 1 of 60% to 80%:

Porosity (%)={1−(density of polymer non-woven fabric/density of raw material polymer)}*100     [Mathematical Formula 1]

6. The lithium-sulfur battery of claim 1, wherein the polymer non-woven fabric has porosity represented by the following Mathematical Formula 1 of 65% to 75%:

Porosity (%)={1−(density of polymer non-woven fabric/density of raw material polymer)}*100     [Mathematical Formula 1]

7. The lithium-sulfur battery of claim 1, wherein the polymer non-woven fabric has an amount of liquid electrolyte impregnation of 150% to 350%, wherein liquid electrolyte impregnation is an increased weight of the liquid electrolyte relative to a weight of the polymer non-woven fabric.

8. The lithium-sulfur battery of claim 1, wherein the positive electrode includes a positive electrode active material layer formed on a current collector, a surface of the positive electrode active material layer is coated with a polymer film including a non-aqueous liquid electrolyte, and voids in the positive electrode active material layer are filled with a polymer material including the non-aqueous liquid electrolyte.

9. The lithium-sulfur battery of claim 8, wherein the polymer film and the polymer material are formed by polymerizing a composition including at least one or more monomers selected from the group consisting of acrylamide, divinyl benzene, butyl acrylate, hexyl acrylate, trimethylolpropane triacrylate, butanediol diacrylate, butanediol dimethacrylate, diallyl succinate, diallyl malate, diallyl suberate, ethylene glycol diacrylate, ethylene glycol dimethacrylate, ethylene glycol divinyl ether, tritetraethylene dimethyl acrylate (TTEGDA), poly(ethylene glycol) diacrylate (PEGDA), polyethylene glycol dimethacrylate (PEGDMA), poly(ethyleneglycol) divinyl ether and diglycidyl ester, and the non-aqueous liquid electrolyte.

* * * * *